US005676039A

United States Patent [19]
Wedding et al.

[11] Patent Number: 5,676,039
[45] Date of Patent: Oct. 14, 1997

[54] SLOPE-CHANNELLED, EASILY CLEANED STEEP TANK FLOOR

[75] Inventors: Rene Eugene Wedding, Coquitlam; Lucio Bruno Sacchetti, West Vancouver, both of Canada

[73] Assignee: CMC Engineering and Management Limited, Coquitlam, Canada

[21] Appl. No.: 678,410

[22] Filed: Jul. 2, 1996

[51] Int. Cl.⁶ .................................................. C12G 1/02
[52] U.S. Cl. .......................... 99/276; 99/277.2; 99/277.1
[58] Field of Search ................. 99/276, 277, 277.1, 99/277.2; 366/306, 101, 107; 100/125; 210/498, 499, 288, 293

[56] References Cited

U.S. PATENT DOCUMENTS 4,361,080  11/1982  Smith et al. ........................... 99/277.1

FOREIGN PATENT DOCUMENTS

| 1004557 | 12/1992 | Belgium . | |
|---|---|---|---|
| 2616797 | 12/1988 | France | 99/277 |
| 2737809 | 3/1978 | Germany | 99/276 |
| 2135692 | 9/1984 | United Kingdom . | |

OTHER PUBLICATIONS

Canada Malting Co. Ltd., Calgary Alberta Steep Tank, CMC Project Mgmt. Ltd. drawing Nos. E2–s–6–02.2 and E2–6–02.3, Jul., 1992.

*Primary Examiner*—Reginald Alexander
*Attorney, Agent, or Firm*—Oyen Wiggs Green & Mutala

[57] ABSTRACT

A flat-surfaced steep tank floor has a "U" shaped primary channel which extends diametrically across the floor, and a plurality of "U" shaped secondary channels which extend transversely to and intersect the primary channel. The channels have perforated covers which can be controllably removed to facilitate cleaning. The primary channel slopes downwardly from one side of tank to the opposite side. Each secondary channel slopes downwardly from one side of the tank to the primary channel. The secondary channels are perforated at regular intervals. The tank is aerated via aeration conduits which extend beneath the floor and communicate with the perforations.

9 Claims, 8 Drawing Sheets

SLOPE-CHANNELLED, EASILY CLEANED STEEP TANK FLOOR

FIELD OF THE INVENTION

This application pertains to a steep tank having a floor in which a plurality of sloped channels are formed to facilitate cleaning and aeration of the tank, as well as extraction of carbon dioxide therefrom. Each channel has a hinged, perforated cover which can be raised to expose the channels when the tank is cleaned.

BACKGROUND OF THE INVENTION

Steep tanks are used to produce malt which is in turn used to produce brewed alcoholic beverages such as beer. A modern industrial steep tank is typically a large volume cylinder which may be about 25 feet or more in height and about 50 feet or more in diameter. A mixture of barley kernels and water is "steeped" in the tank for a suitable interval, typically in the range of about 24 to 60 hours. Air is injected through the tank floor to aerate the barley-water mixture. Carbon dioxide given off by the steep mixture is withdrawn through the floor.

Prior art steep tanks commonly employ a perforated steel false floor which is constructed above the bottom of the tank. The space between the false floor and the bottom of the tank typically contains piping, valves, etc. for draining water or carbon dioxide from the tank, injecting compressed air into the tank, etc.

The steep tank's internal surfaces, including the underside of the false floor, the surfaces which define the space between the false floor and the bottom of the tank, and the surfaces of anything located within that space, become contaminated with bacteria, slime, etc. during the steeping process. All such surfaces must be cleaned periodically to remove such contamination. Preferably, such surfaces are cleaned after each batch of malt is produced.

In earlier prior art designs, the false floor was fixed in place, making it very difficult to adequately clean the floor's underside and anything beneath the floor. The art has since evolved to provide a variety of false floor designs which are somewhat easier to clean.

One prior art technique is to locate the false floor six feet or more above the bottom of the tank. Access panels are provided in the adjacent tank walls to enable workmen to enter the space between the false floor and the bottom of the tank in order to clean the underside of the floor, etc. with pressurized hoses. However, the space between the floor and the bottom of the tank is preferably made as small as possible since it becomes filled with water during the steeping process. Water is relatively expensive. The steeping process is not benefitted by water which fills the space between the floor and the bottom of the tank.

The prior art accordingly evolved in an effort to minimize the space between the false floor and the bottom of the tank. This is typically accomplished by providing a mechanism for raising and lowering the false floor. The floor can thus be raised to a height sufficient to enable workmen to enter and clean the space beneath it. The floor is then lowered, leaving only a small space sufficient to contain aeration and drainage systems as aforesaid.

Despite its advantages, the foregoing technique created some additional problems. For example, before the floor can be raised, it is first necessary to disconnect aeration, drainage, and other systems (which are coupled to the floor from outside the tank) and then reconnect them when the floor is lowered back into position. Further, it is difficult for workmen to adequately clean the underside of an elevated floor by working over their heads with high pressure hoses. Also, safety concerns complicate and increase the cost of the cleaning process. For example, regulations typically require provision of a secondary mechanism to hold the floor in its raised position while workmen are beneath it. Such regulations may also require that valves, electrical controls, etc. for equipment located in the space between the false floor and the bottom of the tank be locked out before workmen enter that space to begin cleaning.

Some of the foregoing difficulties have been circumvented by further evolutions in the art. For example, the false floor is sometimes divided into sections, each of which is hinged to provide underfloor access. This avoids the cost and complexity of raising and lowering the floor for cleaning, but can require additional manual labour. In other cases, a "clean-in-place" system of conduits and nozzles is installed beneath the floor. A caustic solution is pumped through the conduits and sprayed through the nozzles into the space beneath the floor. Although the caustic solution cleans the, surfaces it contacts, it is difficult to ensure that all of the necessary surfaces are adequately contacted by the solution. Furthermore, a caustic film is left which can be difficult to remove and which adversely affects the steeping process, besides corroding some of the surfaces and/or fittings which it contacts.

The present invention provides an improved steep tank floor design which avoids the shortcomings of the prior art.

SUMMARY OF THE INVENTION

In accordance with the preferred embodiment, the invention provides a flat-surfaced steep tank floor. A primary channel extends diametrically across the surface of the floor. A plurality of secondary channels in the surface extend transversely to and intersect the primary channel. Each channel has a perforated, removable cover.

The channels are perforated at regular intervals. Aeration conduits extend beneath the floor in communication with the respective channel perforations.

To facilitate cleaning, the primary channel slopes downwardly from one side of the floor to the opposite side thereof; and, the secondary channels slope downwardly from the sides of the floor to the primary channel. The channels are advantageously "U" shaped in cross-section, to further simplify cleaning. The covers are pivotally connected to the respective channels, with a lifting mechanism being provided to controllably raise and lower the covers.

DETAILED DESCRIPTION OF THE PREFERRED EMBODIMENT

Figure 1:
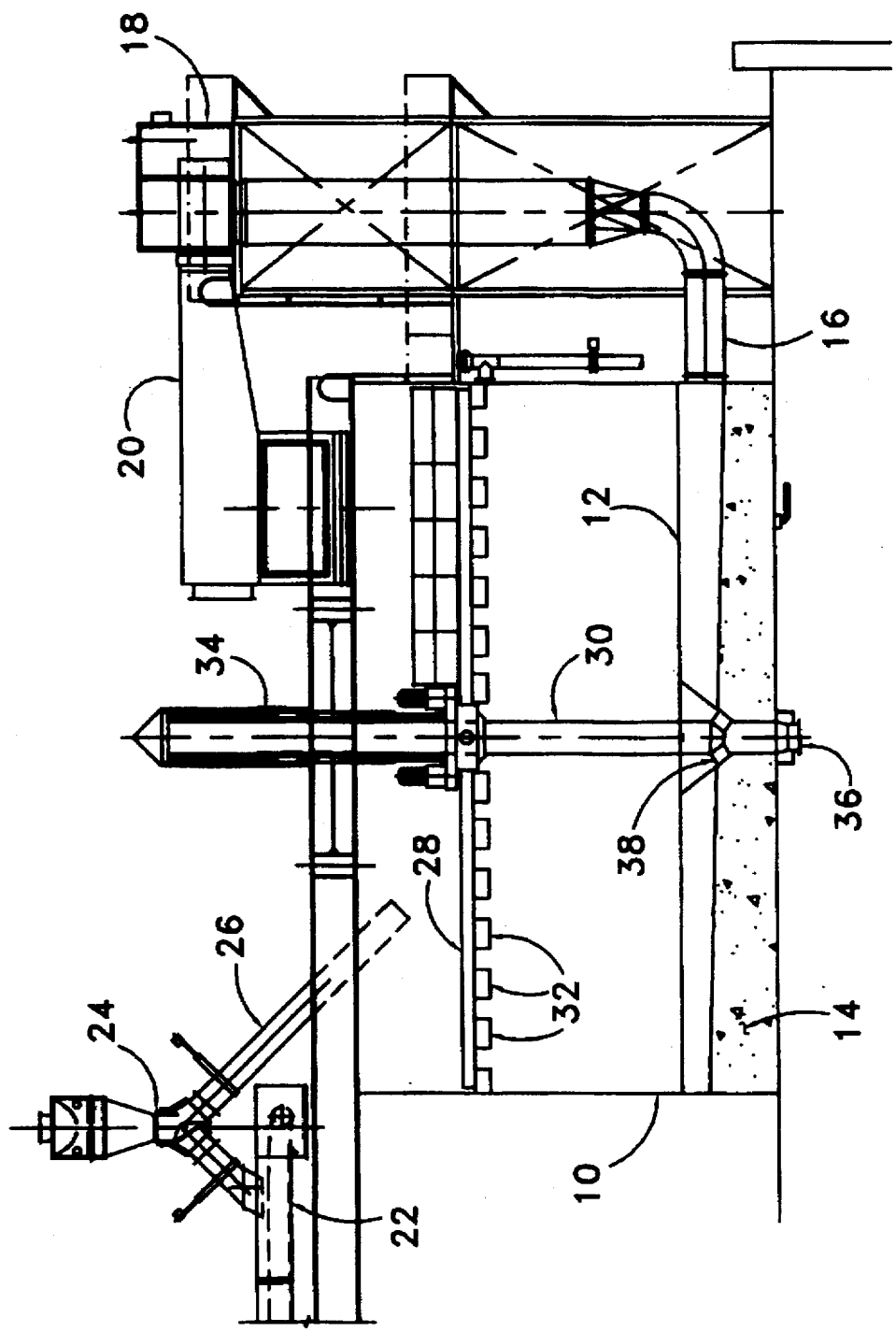
FIG. 1 is a side elevation view of a steep tank having a floor constructed in accordance with the preferred embodiment of the invention.

FIG. 1 depicts a steep tank having a floor constructed in accordance with the invention. Other aspects of the FIG. 1 steep tank are conventional and are therefore described only briefly.

Steep tank 10 is cylindrical in shape. Floor 12 (hereinafter described in greater detail) is constructed atop concrete base 14. Air conduit 16 is coupled to floor 12 as hereinafter described to aerate the contents of tank 10 with air supplied by blower 18, which also extracts carbon dioxide from tank 10 via plenum 20.

Barley kernels (not shown) are fed into tank 10 by conveyor 22, valving system 24 and chute 26. A conventional loader/unloader 28 is rotatably supported within tank 10 on column 30. Barley fed into tank 10 is distributed over floor 12 by paddles 32 on the underside of loader/unloader 28 as loader/unloader 28 rotates about column 30. Lifting cylinder 34 gradually raises loader/unloader 28 as tank 10 fills with barley.

When sufficient barley has been fed into tank 10 water is added to the barley. After a suitable duration the steeped barley is extracted from tank 10 through discharge outlet 36 by counter-rotating loader/unloader 28 so that paddles 32 sweep the barley toward the center of tank 10 for extraction through discharge outlet 36. Column supports 38 project outwardly from the lower end of column 30 at discharge outlet 36. After the steeped barley has been extracted as aforesaid, tank 10 is cleaned and then refilled with barley and water to make a fresh batch of malt.

Figure 2:
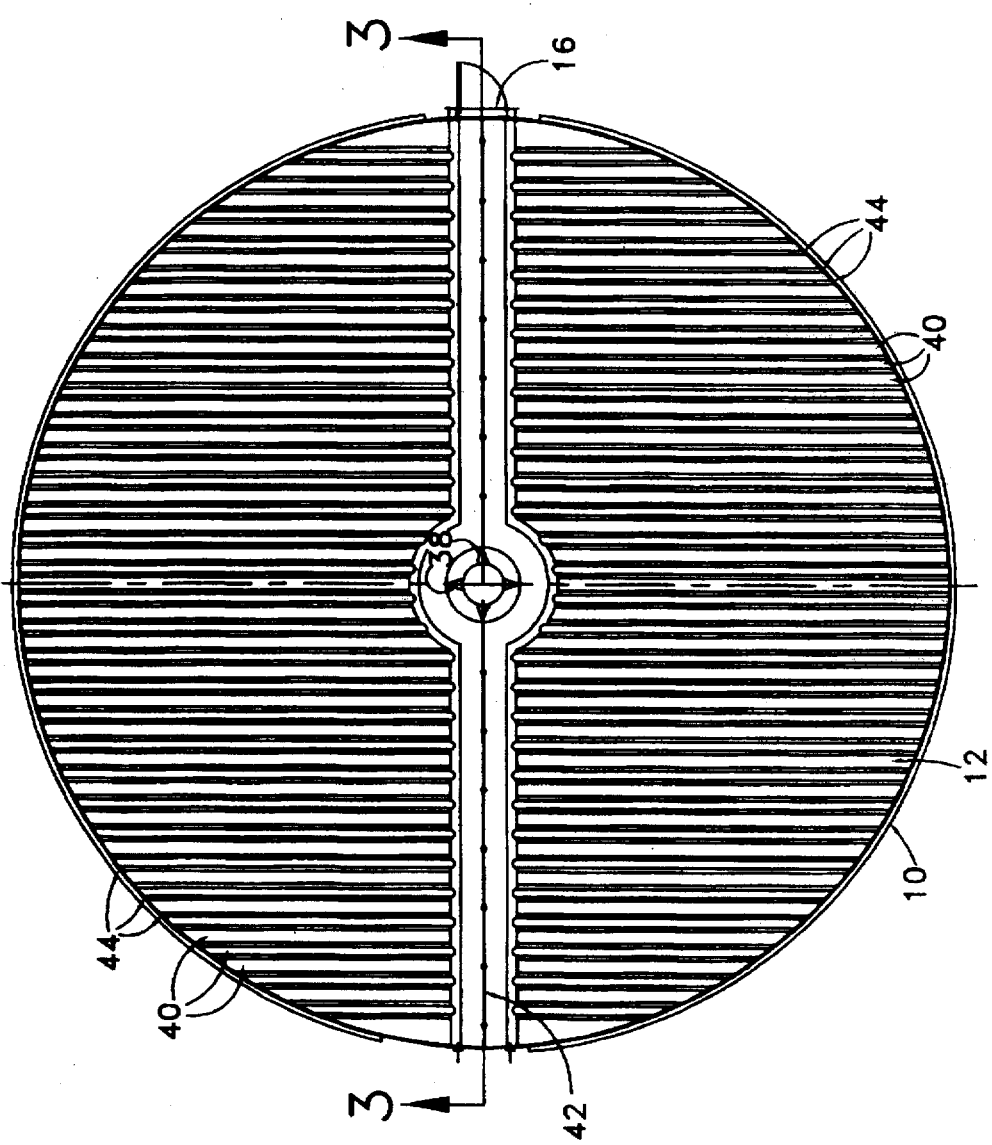
FIG. 2 is a plan view of the floor of the FIG. 1 steep tank.
Figure 3:
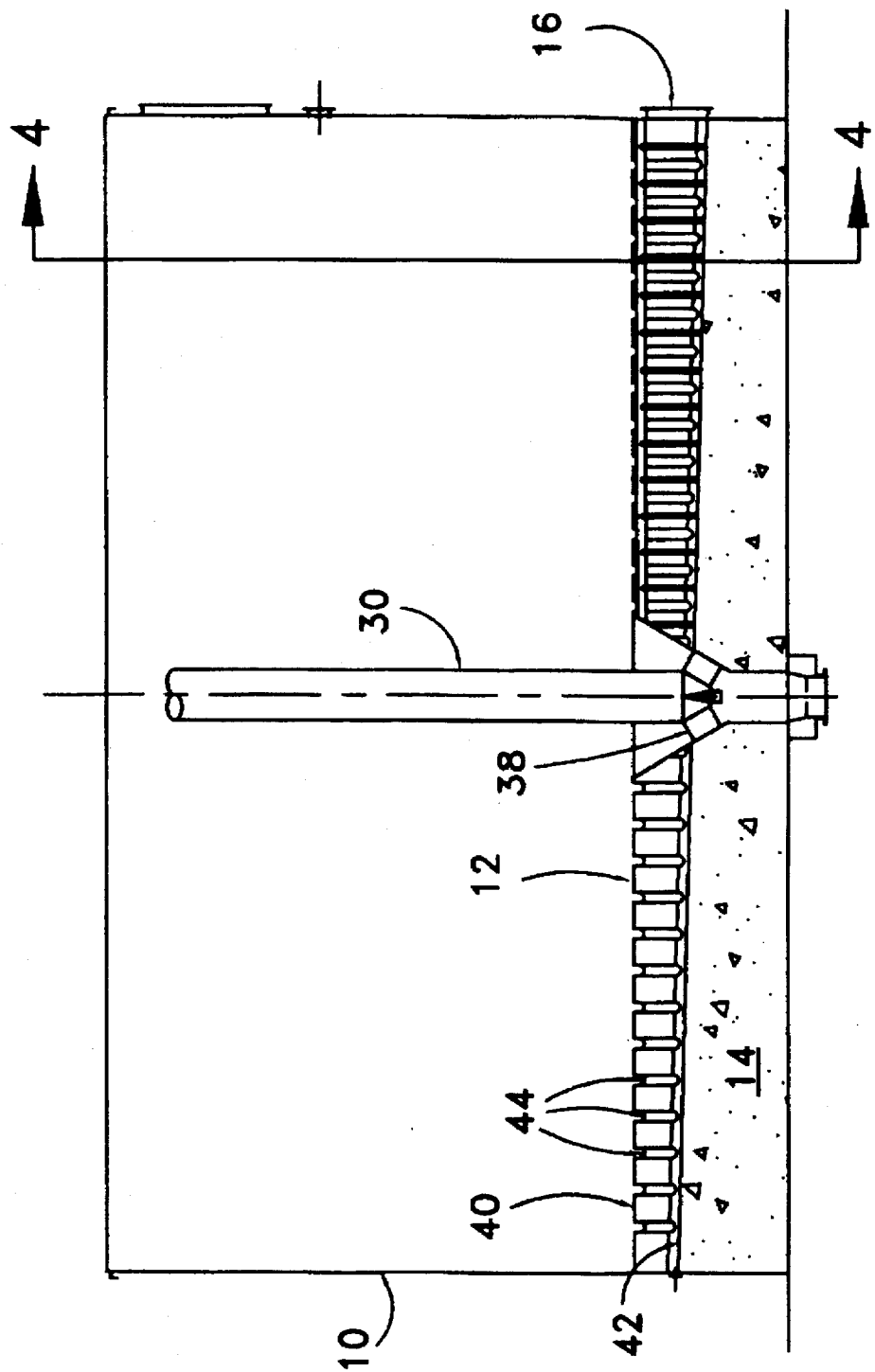
FIG. 3 is a sectional view taken with respect to line 3—3 of FIG. 2.

As depicted in FIGS. 2 and 3, floor 12 has an upper, flat steel surface 40. A primary channel 42 extends diametrically across floor 12. To simplify drainage during cleaning of tank 10, primary channel 42 slopes downwardly from one side of floor 12 to the opposite side thereof, as best seen in FIG. 3. Channel 42 may be about four feet wide in a typical steep tank having a diameter of about fifty feet, about two feet deep at its shallow end and about four feet deep at its opposite end. Channel 42 is preformed of steel. Concrete base 14 is pressure grouted beneath channel 42.

Figure 4:
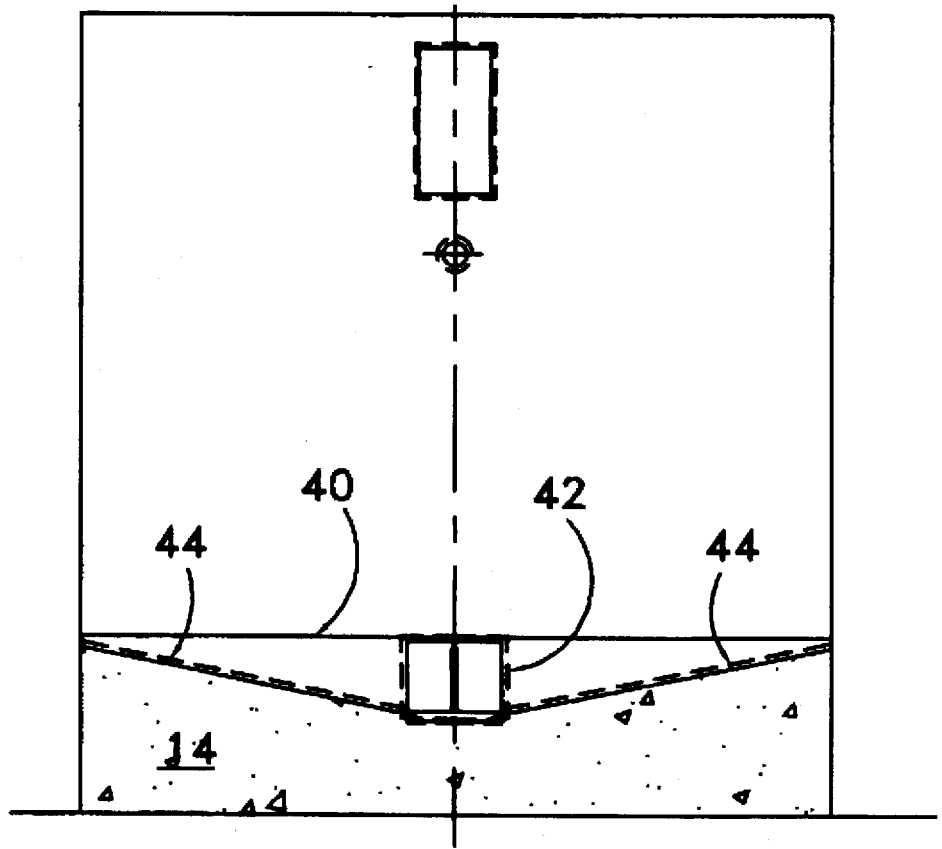
FIG. 4 is a sectional view taken with respect to line 4—4 of FIG. 3.

A plurality of secondary channels 44 extend on either side of primary channel 42. Each secondary channel 44 intersects primary channel 42 and extends transversely away from primary channel 42 to the side of floor 12. As best seen in FIG. 4, secondary channels 44 slope downwardly from the respective sides of floor 12 to intersect primary channel 42, which further simplifies drainage during cleaning of tank 10. Secondary channels 44 may be spaced apart on about two foot centers, with each channel being about six inches wide and six inches deep. Secondary channels 44 are preformed of steel, with concrete base 14 being pressure grouted beneath the channels.

Figure 5:
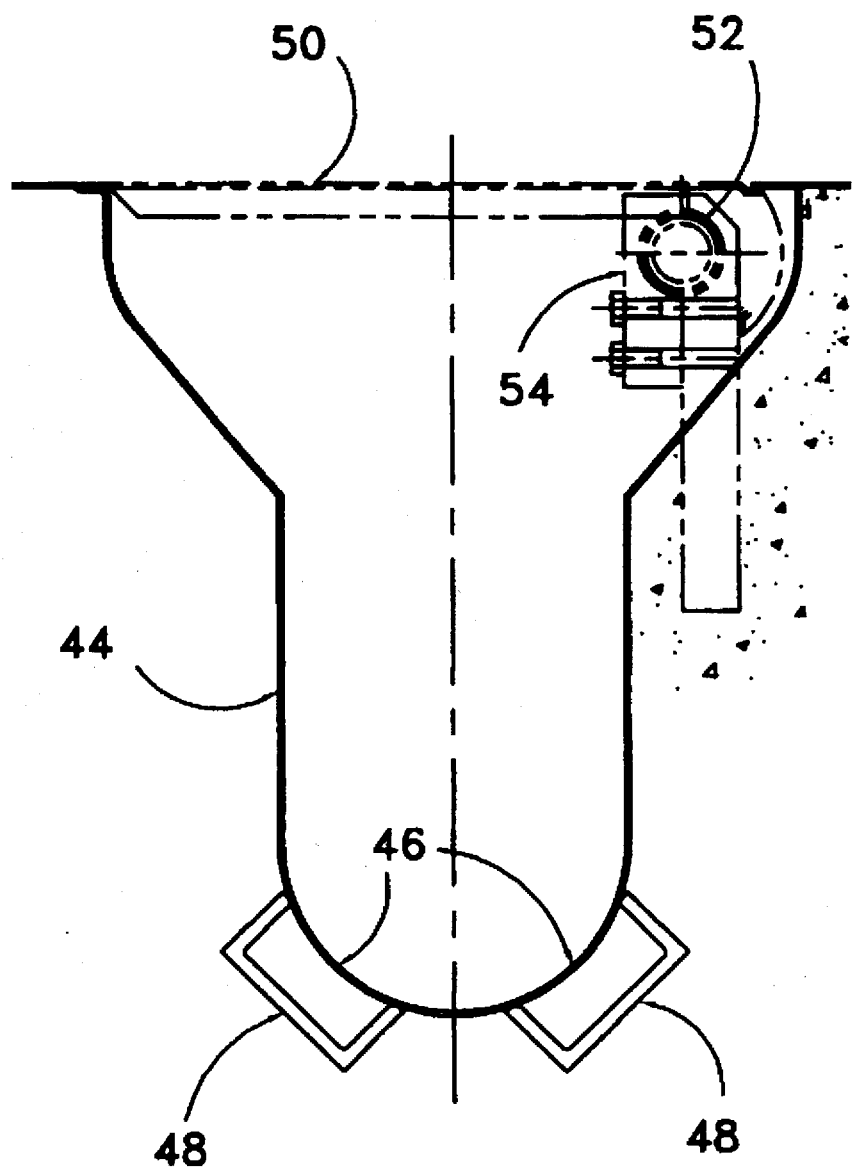
FIG. 5 is an enlarged cross-sectional illustration of one of the secondary channels.

As shown in FIG. 5, secondary channels 44 are preferably "U" shaped in cross-section to avoid sharp corners and simplifying cleaning. Secondary channels 44 incorporate perforations 46 at spaced intervals to facilitate aeration. More particularly, an aeration conduit 48 extends beneath each row of perforations 46. Compressed air can be forced through conduits 48 and perforations 46 to aerate the barley-water steeping mixture.

Figure 6:
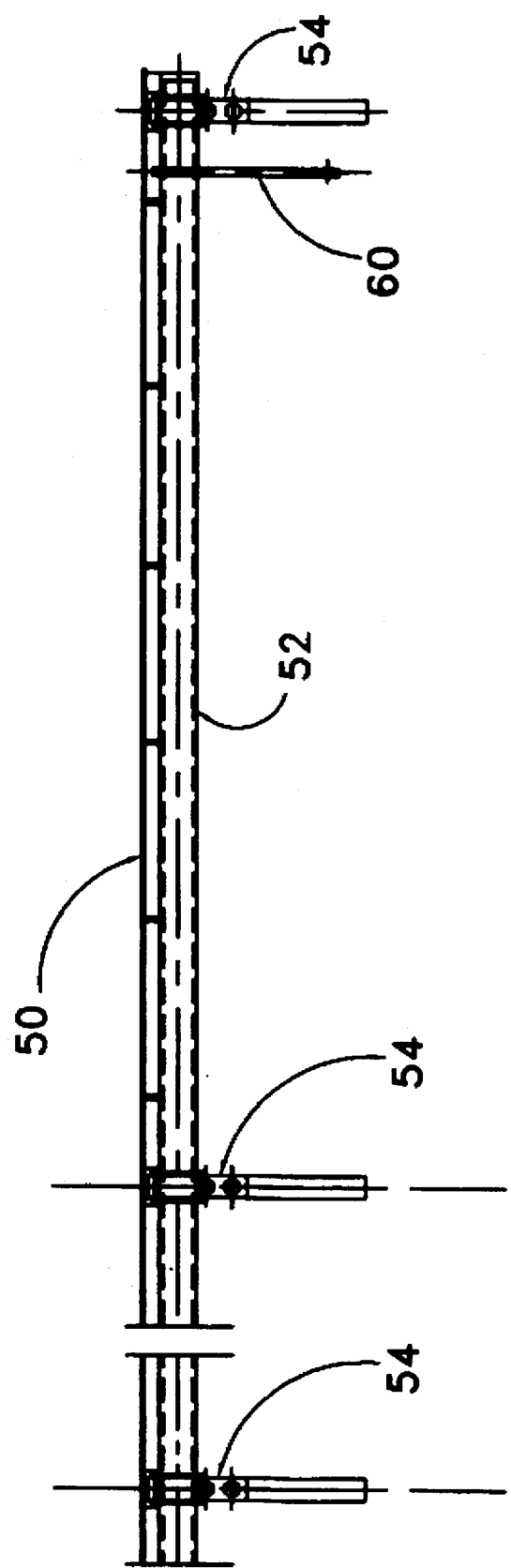
FIG. 6 is a partially fragment elevation view of a portion of a lifting mechanism for raising and lowering a channel cover.
Figure 7:
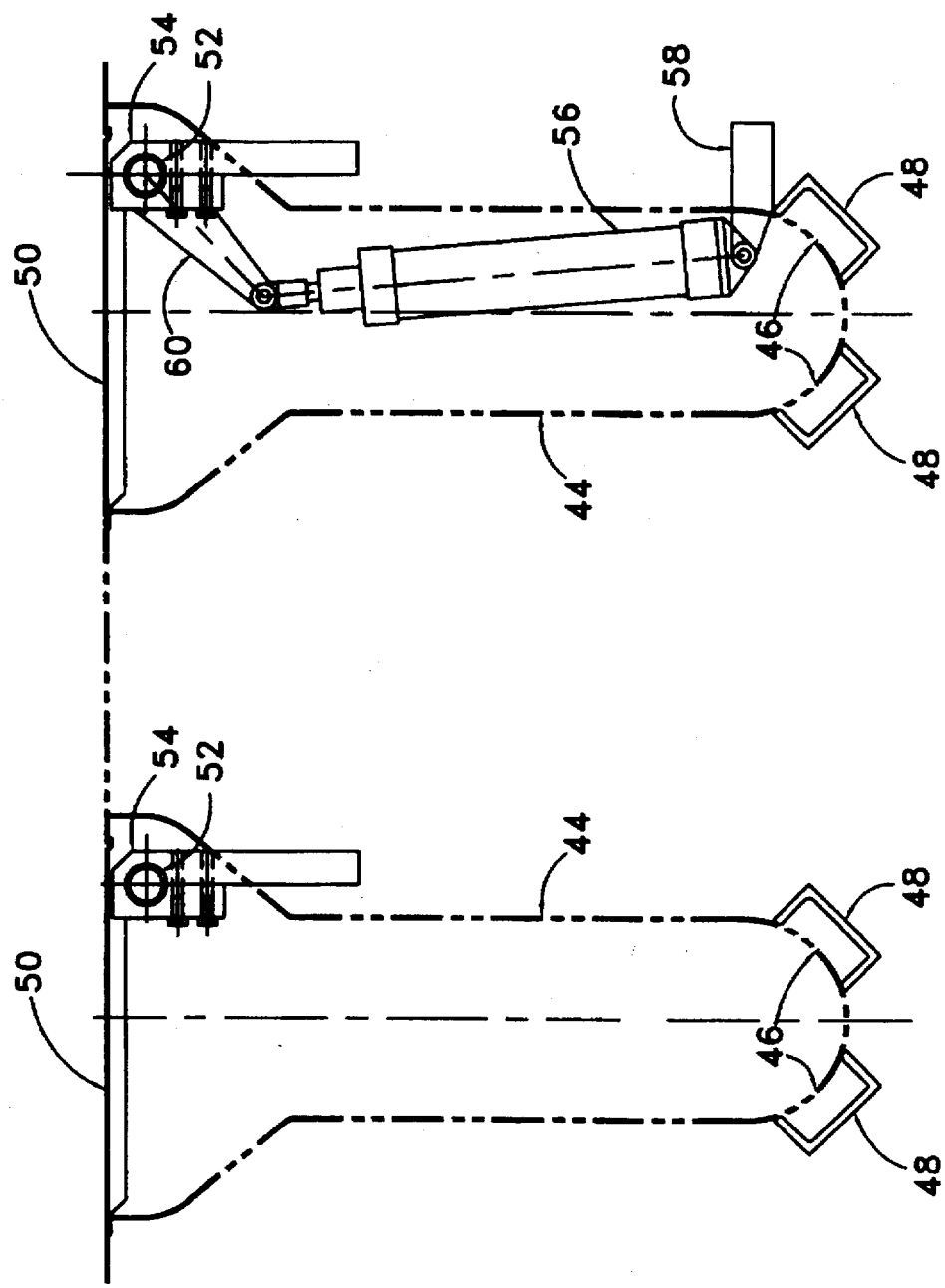
FIG. 7 is an end elevation view showing two adjacent secondary channels and illustrating (in dotted outline) one of the extendible cylinders used to raise and lower the covers.
Figure 8:
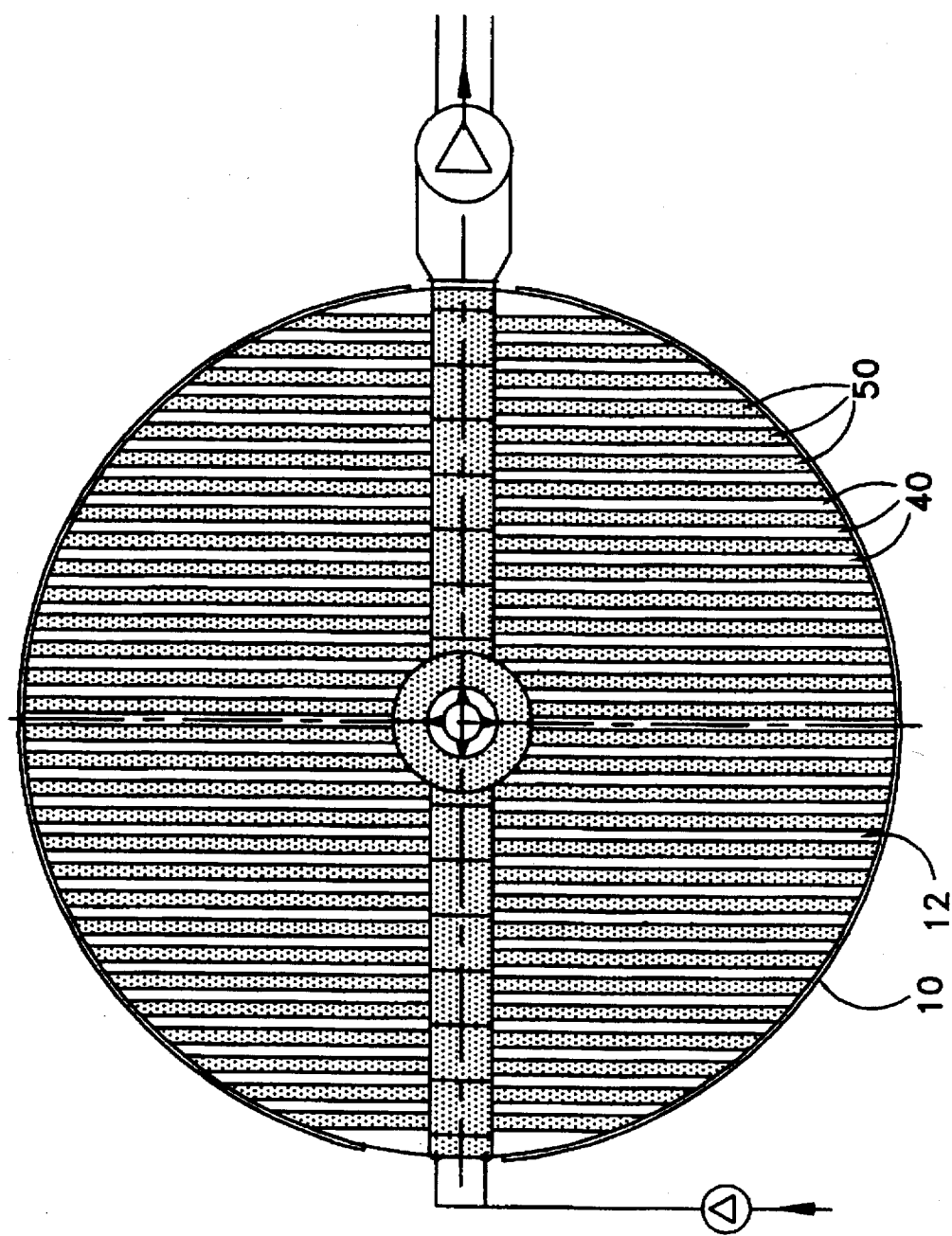
FIG. 8 is similar to FIG. 2, but shows all of the perforated channel covers in place.

FIG. 5 also depicts perforated steel, hinged cover 50, one of which is provided atop each secondary channel 44. A rod 52 (best seen in FIG. 6) extends beneath one longitudinal edge of hinged cover 50. Split bushings 54 couple rod 52 to the underside of cover 50 at spaced intervals. The cylinder end of an extendible cylinder 56 (only one of which is shown in FIG. 7) is pivotally connected to fixed support 58, with the cylinder's rod end being connected to crank arm 60 which is in turn fixed to rod 52. When cylinder 56 is actuated by suitable control means (not shown) its rod extends, rotating crank arm 60 and thereby rotating rod 52 such that cover 50 pivots with respect to rod 52 into a vertically upright position, thus affording unimpeded access for cleaning the interior of secondary channels 44. Primary channel 42 is also covered, and a similar lifting mechanism is provided to raise and lower the cover.

It will thus be understood that the invention provides a steep tank floor which can easily be cleaned without exposing workmen to potential safety hazards by requiring them to work beneath an elevated floor. The invention also avoids the difficulties inherent in manually cleaning the underside of an overhead floor. Indeed, much of the necessary cleaning operation may be performed by a conventional, downwardly directed clean-in-place cleaning system incorporated into loader/unloader 28 in conventional fashion, thus minimizing the manual labour required to complete the floor cleaning operation.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A steep tank floor, comprising:
   (a) a flat surface;
   (b) a primary channel in said surface, said primary channel extending from a first side to an opposed second side of said floor;
   (c) a plurality of secondary channels in said surface, said secondary channels extending transversely to and intersecting said primary channel; and,
   (d) a perforated, removable cover on each of said channels.

2. A steep tank floor as defined in claim 1, wherein said primary channel slopes downwardly from said first to said second side of said floor.

3. A steep tank floor as defined in claim 2, wherein each of said secondary channels extends from one side of said floor to said primary channel.

4. A steep tank floor as defined in claim 3, wherein said respective secondary channels slope downwardly from said one side to said primary channel.

5. A steep tank floor as defined in claim 4, wherein said channels are generally "U" shaped in cross-section.

6. A steep tank floor as defined in claim 5, wherein said channels are perforated.

7. A steep tank floor as defined in claim 6, further comprising a plurality of aeration conduits extending beneath said floor in communication with said respective channel perforations.

8. A steep tank floor as defined in claim 7, wherein said covers are pivotally connected to said respective channels and further comprising lifting means for pivotally raising said covers.

9. A steep tank floor as defined in claim 8, wherein said lifting means further comprises, for each of said channels:
   (a) a rod extending beneath and connected to one longitudinal edge of said channel cover;
   (b) a crank arm attached to said rod; and,
   (c) an extendible cylinder connected at one end to said crank arm and at an opposed end to a fixed support.

\* \* \* \* \*